(12) United States Patent
White

(10) Patent No.: US 7,603,464 B2
(45) Date of Patent: Oct. 13, 2009

(54) METHOD AND SYSTEM FOR IDENTIFYING AVAILABLE RESOURCES IN A PEER-TO-PEER NETWORK

(75) Inventor: Payton R. White, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 969 days.

(21) Appl. No.: 10/857,559

(22) Filed: May 27, 2004

(65) Prior Publication Data
US 2005/0021758 A1     Jan. 27, 2005

Related U.S. Application Data

(60) Provisional application No. 60/476,084, filed on Jun. 4, 2003.

(51) Int. Cl.
*G06F 15/16* (2006.01)
(52) U.S. Cl. .................................. 709/226; 718/104
(58) Field of Classification Search .......... 709/204, 709/206, 226; 718/104
See application file for complete search history.

(56) References Cited

U.S. PATENT DOCUMENTS

| | | | | |
|---|---|---|---|---|
| 5,333,268 | A * | 7/1994 | Douglas et al. | 709/244 |
| 5,995,971 | A * | 11/1999 | Douceur et al. | 709/218 |
| 6,185,561 | B1 * | 2/2001 | Balaban et al. | 707/6 |
| 6,301,616 | B1 * | 10/2001 | Pal et al. | 709/226 |
| 6,487,546 | B1 * | 11/2002 | Witkowski | 707/1 |
| 6,823,514 | B1 * | 11/2004 | Degenaro et al. | 718/104 |
| 7,177,904 | B1 * | 2/2007 | Mathur et al. | 709/204 |
| 7,289,514 | B2 * | 10/2007 | Robotham et al. | 370/395.4 |
| 2002/0049810 | A1 * | 4/2002 | Fitzgerald et al. | 709/203 |
| 2002/0073204 | A1 * | 6/2002 | Dutta et al. | 709/227 |
| 2002/0147771 | A1 * | 10/2002 | Traversat et al. | 709/203 |

(Continued)

OTHER PUBLICATIONS

Lv, Q., Cao, P., Cohen, E., Li, K., and Shenker, S. 2002. Search and replication in unstructured peer-to-peer networks. In Proceedings of the 16th international Conference on Supercomputing (New York, New York, USA, Jun. 22-26, 2002). ICS '02. ACM, New York, NY, 84-95.*

(Continued)

*Primary Examiner*—Larry D Donaghue
*Assistant Examiner*—Ajay Bhatia
(74) *Attorney, Agent, or Firm*—Martine Penilla & Gencarella, LLP

(57) ABSTRACT

A method for a peer of a peer-to-peer network to search for an available resource is provided. The method initiates with representing a request for the available resource as a request bit string. The method includes transmitting the request to a parent of the peer. Then, an aggregate availability bit string associated with the parent is accessed. The aggregate availability bit string represents an aggregate resource availability for all children of the parent. Next, a logical operation is performed with the bits of the aggregate availability bit string and the bits of the request bit string. Then, it is determined whether any of the children of the parent are able to provide the available resource based upon a result of the logical operation. A peer-to-peer grid and a system for publishing and identifying an available resource in a peer-to-peer distributed network are also provided.

15 Claims, 10 Drawing Sheets

U.S. PATENT DOCUMENTS

| | | | | |
|---|---|---|---|---|
| 2003/0065774 | A1* | 4/2003 | Steiner et al. | 709/225 |
| 2004/0122825 | A1* | 6/2004 | Pulaski | 707/100 |
| 2004/0148611 | A1* | 7/2004 | Manion et al. | 719/328 |
| 2008/0256243 | A1* | 10/2008 | White | 709/226 |
| 2008/0263208 | A1* | 10/2008 | White | 709/226 |

OTHER PUBLICATIONS

Ripeanu, M., "Peer-to-peer architecture case study: Gnutella network," Peer-to-Peer Computing, 2001. Proceedings. First International Conference on , vol., no., pp. 99-100, Aug. 2001.*

The Annotated Gnutella Protocol Specification v0.4, Updated Mar. 15, 2001.*

Fukuda, K.; Sato, S.-Y.; Akashi, O.; Hirotsu, T.; Kurihara, S.; Sugawara, T., "On the use of hierarchical power-law network topology for server selection and allocation in multi-agent systems," Intelligent Agent Technology, IEEE/WIC/ACM International Conference on , vol., no., pp. 81-87, Sep. 19-22, 2005.*

Rhea, et al., "*Probabilistic Location and Routing*," Jun. 23, 2002, Proceedings IEEE Infocom 2002.

Li et al., "*Research of Peer-to-Peer Network Architecture*," Apr. 9, 2003, Proceeding of ICCT2003.

"Bit String Resource Allocation Mechanism," Oct. 1, 1976, IBM Technical Disclosure Bulletin.

Hsiao et al., "*A Tree Model for Structured Peer-to-Peer Protocols*," May 12, 2003, Proceedings of the CCGRID' 03.

Hsiao et al., "*Tornado: A Capability-Aware Peer-to-Peer Storage Network*," Apr. 22, 2003, IEEE Computer Society.

\* cited by examiner

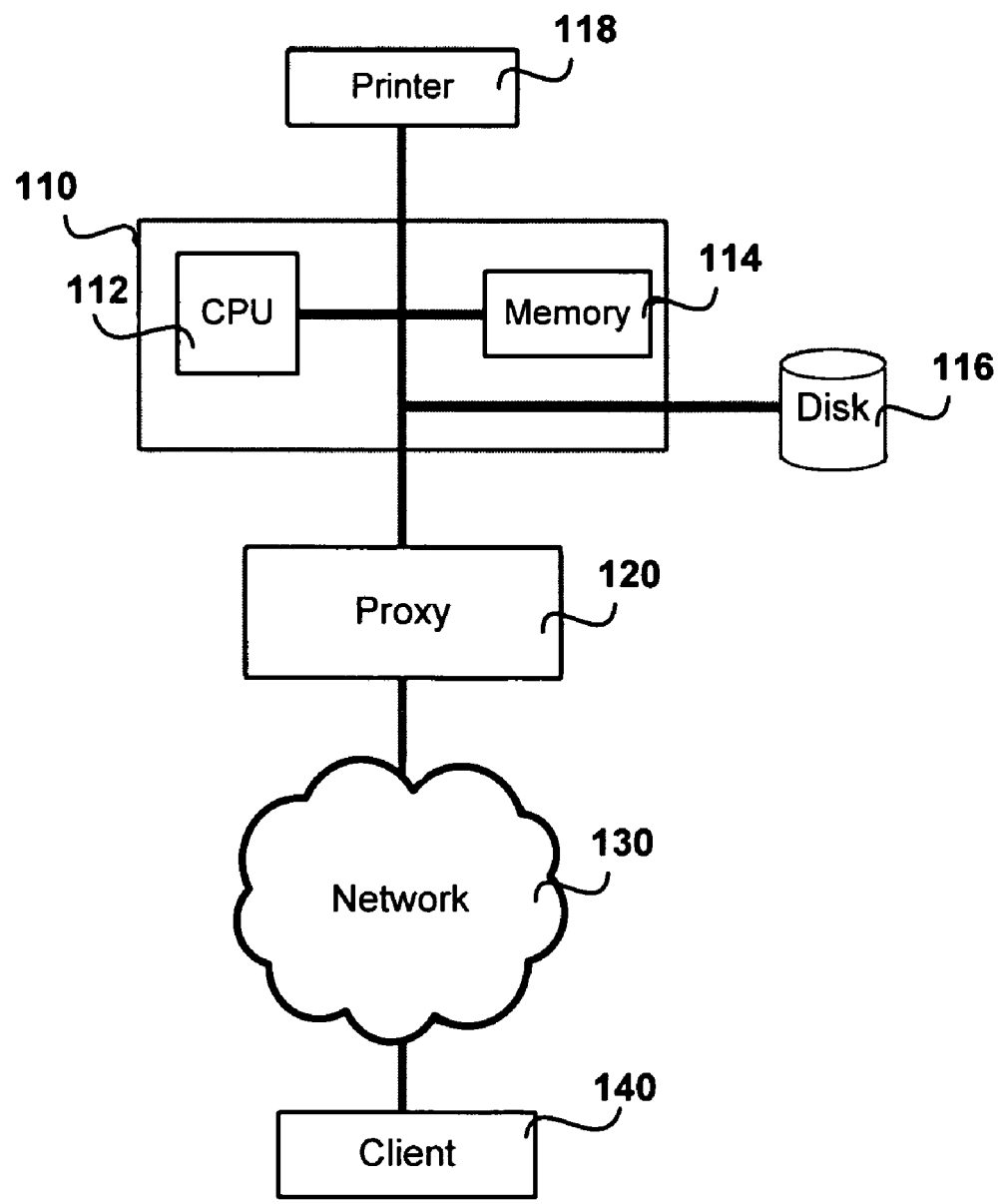
Fig. 1 (*prior art*)

METHOD AND SYSTEM FOR IDENTIFYING AVAILABLE RESOURCES IN A PEER-TO-PEER NETWORK

CROSS REFERENCE TO RELATED APPLICATIONS

This application claims priority under 35 U.S.C. § 119(e) to U.S. Provisional Patent Application No. 60/476,084, filed on Jun. 4, 2003 and entitled "Virtual/Real World Dynamic Intercommunication Methods and Systems," which is hereby incorporated by reference in its entirety for all purposes. This application is related to application Ser. No. 10/845,508 filed on May 12, 2004 and entitled "COMMAND AND CONTROL OF ARBITRARY RESOURCES IN A PEER-TO-PEER NETWORK," which is hereby incorporated by reference in its entirety for all purposes.

BACKGROUND

1. Field of the Invention

The present invention relates to peer-to-peer networks, and more specifically to manipulating and querying arbitrary resources of peers in the peer-to-peer network.

2. Description of the Related Art

Currently, a client can access resources through a server over a network. For example, FIG. 1 is a prior art diagram illustrating a client 140 accessing resources over a network 130. A server 110 interfaced by a proxy server 120 provides access to multiple resources of the server 110. The resources can include a central processing unit (CPU) 112, a memory 114, a disk 116, and a printer 118. Typically, the client 140 requests access to a resource, such as the printer 118 and the proxy server 120 either grants or disallows access. It should be appreciated that in this type of system the available resources are pre-set as being available to the client. That is, the client does not have to search for available resources that may be desired.

In a decentralized network, e.g., a peer-to-peer network, as the number of peers in the network become large, each peer is incapable of notifying each of the other peers of its available resources because of the large number of peers. One barrier for a system having a large number of peers, i.e., hundreds of thousands of peers, is the bandwidth required for handling the publishing of available resources between each of the peers. One technique to address the publishing of resources has been to allow searching for an exact resource and not a range of resources. This type of search is limiting as an exact amount is not the preferable search format, i.e., it is preferable to search for a resource having a minimum or maximum percentage of the resource available. In addition, as resource availability tends to constantly change, the update rate and the bandwidth consumed by the constant updates of the exact available amount of the resource become excessive.

Accordingly, a method and an apparatus for enabling notification of available resources in a deterministic manner that does not impact performance for a decentralized network are needed.

SUMMARY OF THE INVENTION

Broadly speaking, the present invention is a method and system for identifying available resources in a peer-to-peer network. It should be appreciated that the present invention can be implemented in numerous ways, such as a process, an apparatus, a system, or a method on a computer readable medium. Several inventive embodiments of the present invention are described below.

In one embodiment, a method for a peer of a peer-to-peer network to publish available resources is provided. The method initiates with determining an available resource of the peer. The method includes expressing the available resource as a bit string. Then, the bit string is transmitted to a parent of the peer.

In another embodiment, a method for a peer of a peer-to-peer network to search for an available resource is provided. The method initiates with representing a request for the available resource as a request bit string. The method includes transmitting the request to a parent of the peer. Then, an aggregate availability bit string associated with the parent is accessed. The aggregate availability bit string represents an aggregate resource availability for all children of the parent. Next, a logical operation is performed with the bits of the aggregate availability bit string and the bits of the request bit string. Then, it is determined whether any of the children of the parent are able to provide the available resource based upon a result of the logical operation.

In yet another embodiment, a computer readable medium having program instructions for a peer of a peer-to-peer network to publish available resources is provided. The computer readable medium includes program instructions for determining an available resource of the peer and program instructions for expressing the available resource as a bit string. Program instructions for transmitting the bit string to a parent of the peer are provided.

In still yet another embodiment, a computer readable medium having program instructions for a peer of a peer-to-peer network to search for an available resource is provided. Program instructions for representing a request for the available resource as a request bit string and program instructions for transmitting the request to a parent of the peer are provided. Program instructions for accessing an aggregate availability bit string associated with the parent, where the aggregate availability bit string represents an aggregate resource availability for all children of the parent, are included. Program instructions for performing a logical operation with bits of the aggregate availability bit string and bits of the request bit string are provided. Program instructions for determining whether any of the children of the parent are able to provide the available resource based upon a result of the logical operation.

In another embodiment, a system for publishing and identifying an available resource in a peer-to-peer distributed network is provided. The system includes topology management logic for organizing nodes within the peer-to-peer distributed network into a hierarchical tree. Resource level logic configured to determine the availability of a resource contained within a node of the hierarchical tree is included. The resource level logic is further configured to represent the availability of the resource as a first bit string for transmission to a parent of the node, wherein the parent is configured to compare request strings to the first bit string through a logical operation in order to determine whether the resource can be fulfilled by the node.

In yet another embodiment, a peer-to-peer grid is provided. The peer-to peer grid includes a plurality of peers configured to be arranged in a hierarchical tree. The plurality of peers includes a first peer in communication with a second peer. The first peer is configured to transmit an availability string to the second peer. The availability string represents availability of a resource associated with the first peer. A third peer configured to generate a request string representing a request for the resource is provided. Logic for comparing bits of the availability string to bits of the request string in order to determine if the second string can fulfill the request for the resource is included. The logic is locally available to each of the plurality of peers.

In still yet another embodiment, a peer-to-peer network capable of being searched for an available resource is provided. The peer-to-peer network includes means for representing a request for the available resource as a request bit string and means for transmitting the request to a parent of the peer. Means for accessing an aggregate availability bit string associated with the parent, where the aggregate availability bit string represents an aggregate resource availability for all children of the parent. Means for performing a logical operation with bits of the aggregate availability bit string and bits of the request bit string and means for determining whether any of the children of the parent are able to provide the available resource based upon a result of the logical operation are provided.

Other aspects of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 1 is a prior art diagram illustrating a client 140 accessing resources over a network 130.

DETAILED DESCRIPTION

The following embodiments describe a method and apparatus for identifying an available resource in a decentralized network. As used herein, resources can include any physical component of a peer that is connected to the peer-to-peer (P2P) network. Exemplary physical components include processors, co-processors, storage devices, memory, swap space, radio receivers, radio telescopes, image capture devices such as cameras, printers, display devices, security devices, and media-specific devices such as digital video disc (DVD) drives and CD drives. Thus, any physical component is possible, as long as a first peer connected to the P2P network can take command and control of the physical component of a second peer in the P2P network. It will be obvious, however, to one skilled in the art, that the present invention may be practiced without some or all of these specific details. In other instances, well known process operations have not been described in detail in order not to unnecessarily obscure the present invention.

Peer-to-peer networks are decentralized computing systems such that each peer has roughly equivalent capabilities with any other peer. In some exemplary embodiments, a peer can include any computing device, such as a desktop-class computer, a server-class computer, a mobile device, a game machine, and a game console. However, in other embodiments, the peer can be a computing device that is capable of establishing communication with another computing device, as long as the computing devices are connected to the P2P network.

Figure 2A:
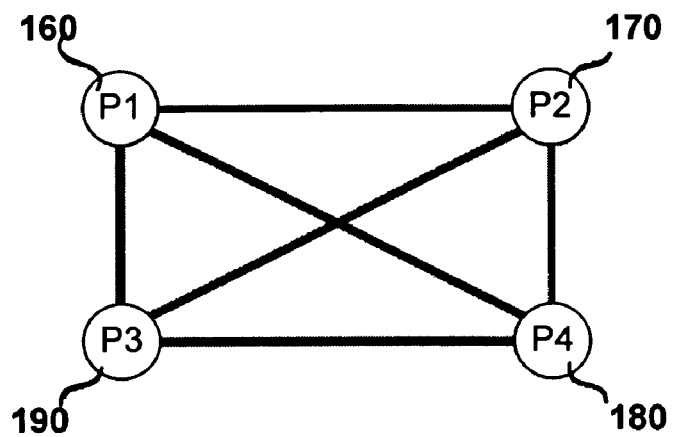
FIG. 2A is a diagram illustrating a fully connected peer-to-peer network, in accordance with an embodiment of the invention.

In contrast with centralized computing systems, such as client/server environments, any peer in the P2P network can interact directly with any other peer in the P2P network. Thus, in the P2P network, a first peer is not a "server" for a second peer that is a "client" for applications and devices located on the server. Moreover, P2P networks can have many configurations. For example, FIG. 2A is a diagram illustrating a fully connected peer-to-peer network, in accordance with an embodiment of the invention. In the fully connected P2P network, first peer 160, second peer 170, third peer 180, and fourth peer 190 communicate directly with one another because each peer has a connection to every other peer. In one exemplary embodiment, a resource of first peer 160, such as a DVD recorder, co-processor, memory, etc., may be accessed by second peer 170, third peer 180, and/or fourth peer 190.

For example, when fourth peer 190 accesses the DVD recorder of first peer 160, first peer 160 interfaces with fourth peer 230 to provide command and control of the DVD recorder to fourth peer 190. The interface can be any suitable graphics interface. Exemplary embodiments can include a web browser, a terminal screen, and a graphics user interface (GUI). Additionally, the interface can be any mechanism, e.g., an application programming interface (API), that permits fourth peer 190 to take command and control of the DVD recorder of first peer 160, as long as the peers are connected in the P2P network. In order to access the resource of first peer 160, the first peer publishes the resource on the P2P network with some or all of the other peers.

Figure 2B:
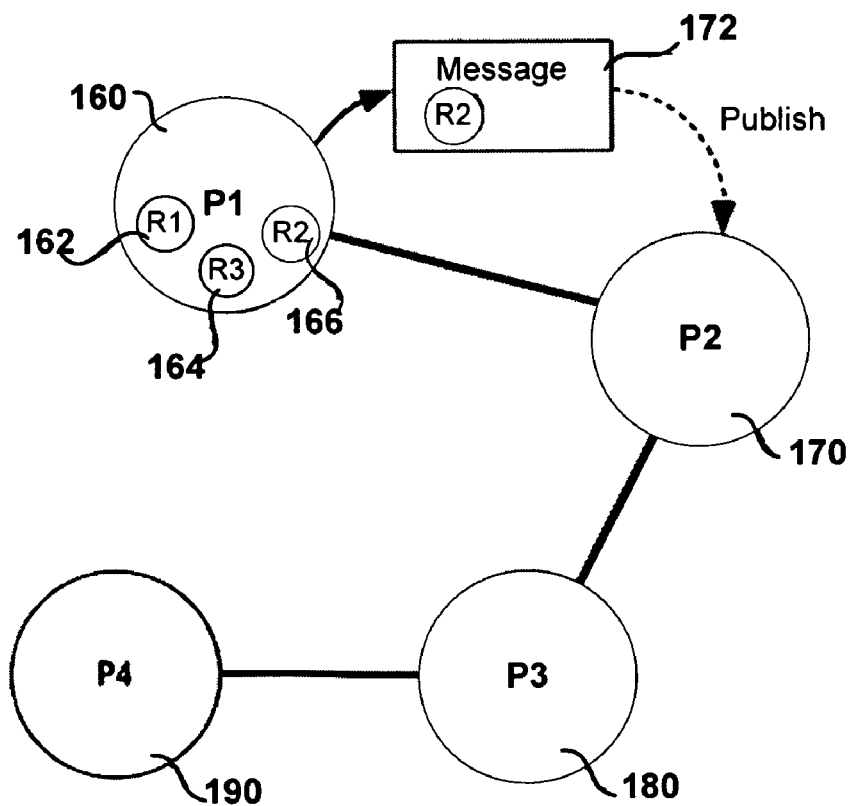
FIG. 2B is a diagram illustrating a peer publishing resources in a peer-to-peer network, in accordance with an embodiment of the invention.

FIG. 2B is a diagram illustrating a peer publishing resources in a peer-to-peer network, in accordance with one embodiment of the invention. The peers in the fully connected P2P network may be connected serially. In one embodiment of a nonfully connected P2P network, first peer 160 can connect to second peer 170. Second peer 170 can then connect to third peer 180, and so on. First peer 160 manages three available resources, such as first resource 162, second resource 164, and third resource 166. Further, the peers can have any number of resources and can also be connected in any network configuration, as long as the peers can communicate with one another in a P2P network. Exemplary resources include processors, co-processors, memory, disk space, video/coding/decoding resources, etc.

To identify the resources of a particular peer, such as first peer 160, the first peer publishes the resource. In one exemplary embodiment, first peer 160 publishes second resource 164 on the P2P network. Specifically, first peer 160 transmits message 172 to publish the second resource to second peer 170. After publication, any peer on the P2P network, such as third peer 180 and fourth peer 190, can access second resource 164 by identifying the peer that manages second resource 164. This identification process is described in more detail below. Because first peer 160 published second resource 164 to second peer 170, the second peer identifies first peer 160 as managing the second resource 164. Subsequently, third peer 170 and fourth peer 180 only need to send a request for second resource 164 to the peers on the P2P network to find out which peer manages second resource 164.

Figure 2C:
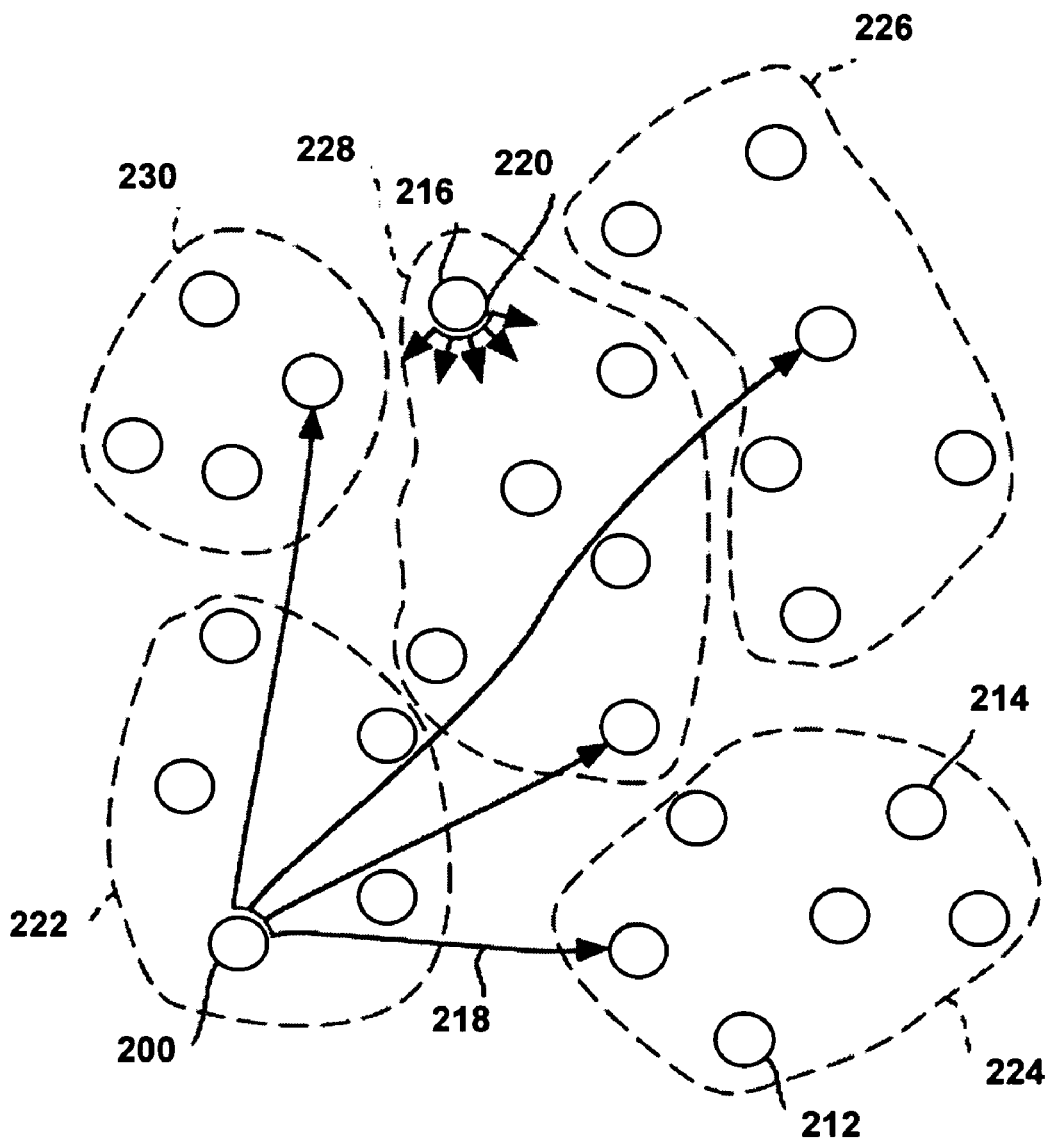
FIG. 2C is a simplified schematic diagram illustrating a scheme for publishing and requesting resources between zones and a peer-to-peer network, in accordance with one embodiment of the invention.

FIG. 2C is a simplified schematic diagram illustrating a scheme for publishing and requesting resources between zones and a peer-to-peer network, in accordance with one embodiment of the invention. Zones 222, 224, 226, 228 and 230 represent different local areas containing peers. Each peer, such as peers 200, 212, 214, and 216 may connect to one another and each zone may connect to one another. In one embodiment, peer 200 can publish resources to multiple peers in other zones using multiple messages 218. After publication, if peer 216 desires access to a resource managed by peer 200, then peer 216 may transmit a message request 220 to other peers in zone 228. If a peer in zone 228 cannot identify the peer managing the resource requested by peer 216, then the message request 220 may propagate to other zones. Eventually, a peer in the peer-to-peer network from any of the zones can identify the peer managing the requested resource.

Figure 2D:
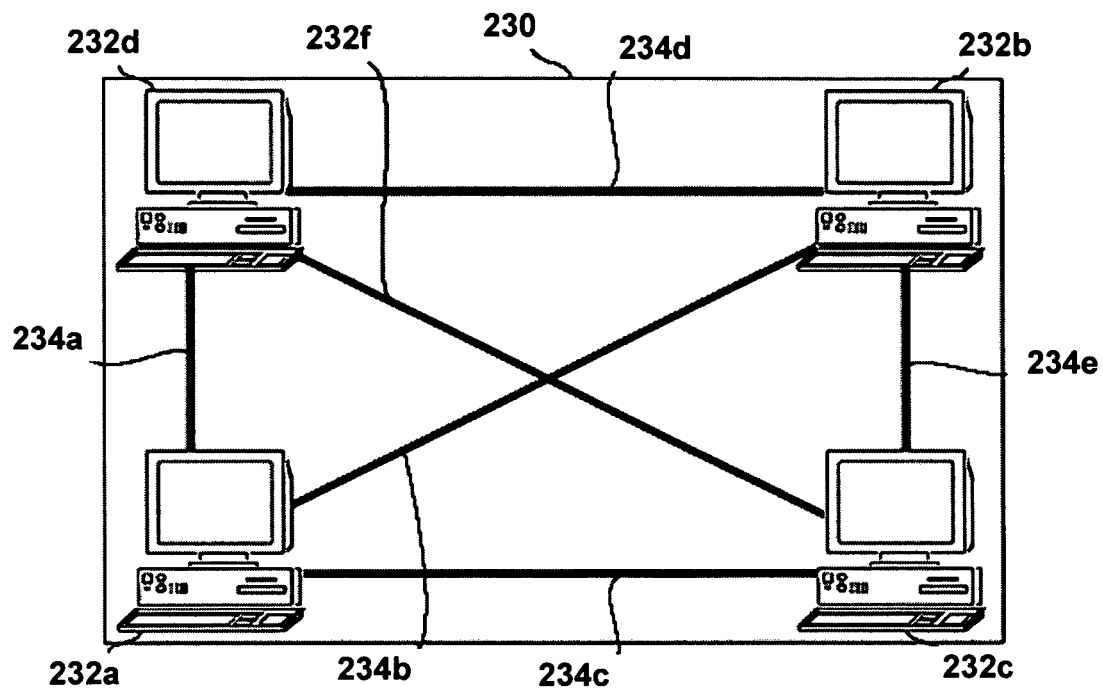
FIG. 2D is a simplified schematic diagram illustrating computing devices functioning as peers in one of the zones of the peer-to-peer network illustrated in FIG. 2A.

FIG. 2D is a simplified schematic diagram illustrating computing devices functioning as peers in one of the zones of the peer-to-peer network illustrated in FIG. 2A. Here, zone 230 includes peers 232a through 232d. Each of peers 232a-d are in communication with each other as illustrated by lines 234a-e. It should be appreciated that computing devices 232a-d may be any suitable computing device such as a general purpose computer, a video game console, a hand-held electronic device, etc. Of course, the communication between peers may occur through a wired connection, a wireless connection, or some combination of the two.

Figure 2E:
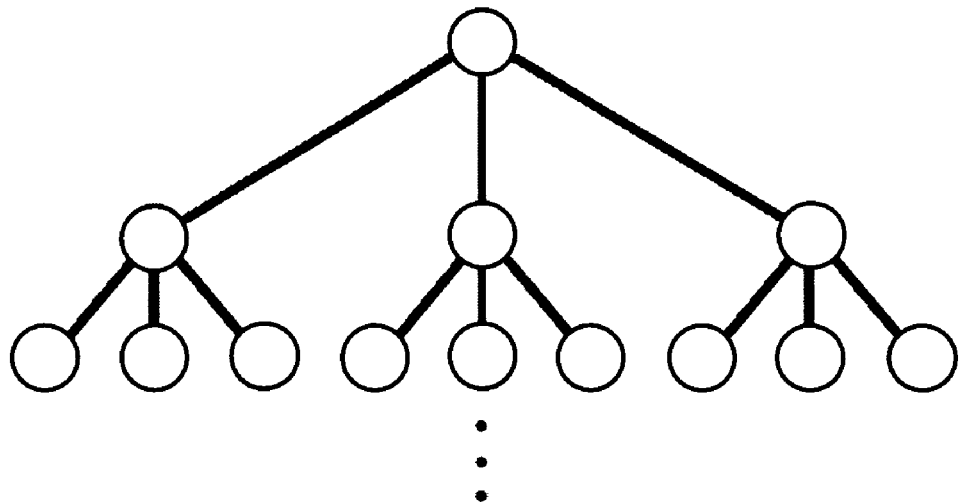
FIGS. 2E and 2F are simplified schematics illustrating two hierarchical tree structures that may be incorporated to organize the peers of the P2P network in accordance with one embodiment of the invention.
Figure 2F:
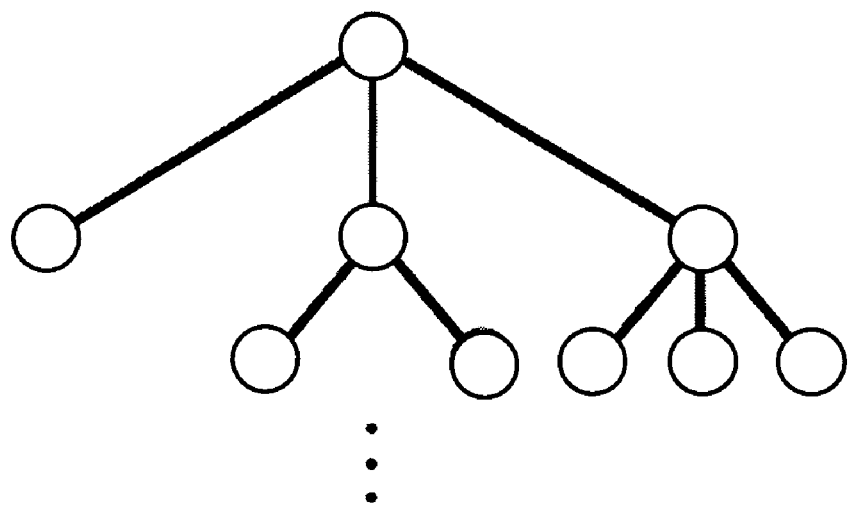

FIGS. 2E and 2F are simplified schematics illustrating two hierarchical tree structures that may be incorporated to organize the peers of the P2P network in accordance with one embodiment of the invention. In FIG. 2E, a regular recursive tree is illustrated. Here each parent is associated with the same number of children. That is, each parent has three children here. It should be appreciated that each parent having three children is shown for exemplary purposes only and is not meant to be limiting as each parent may have any suitable number of children. In FIG. 2F, an irregular self organizing tree structure is illustrated. Here, the parent and children are organized based on a heuristic, such as locality. For example, the peers in this structure may organize themselves based on the network round trip time (rtt). It should be appreciated that each peer of the P2P network includes the required code to create the organized tree structure. That is, each peer is configured to communicate with each other in order to create the organized tree structure that enables the propagation of the low bandwidth bit stream in order to locate available resources within the P2P network.

Figure 3:
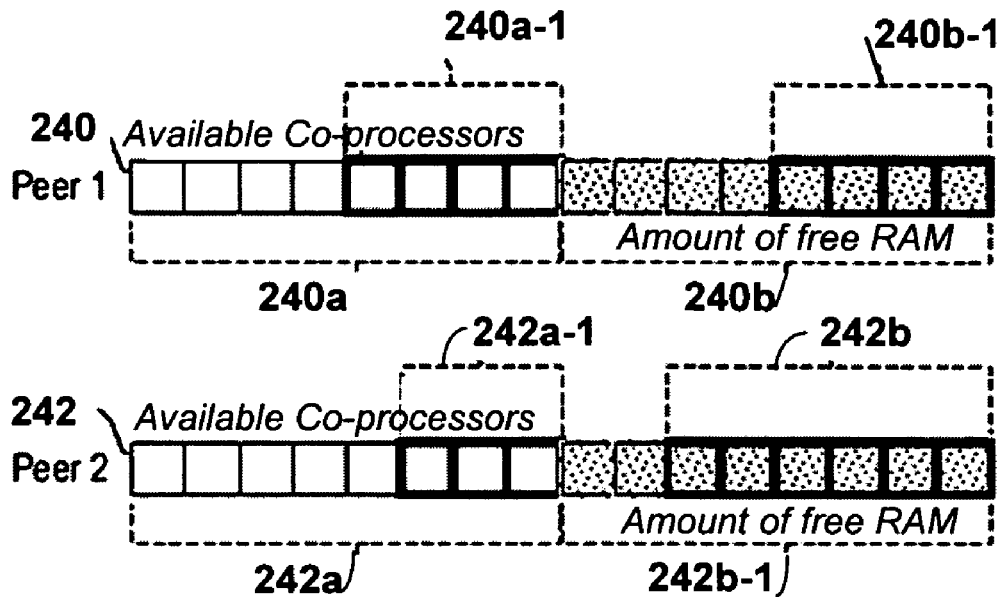
FIG. 3 is a simplified schematic diagram illustrating a method for expressing resource availability in accordance with one embodiment of the invention.

FIG. 3 is a simplified schematic diagram illustrating a method for expressing resource availability in accordance with one embodiment of the invention. Here, the resource availability for resources such as co-processors, and random access memory (RAM) for peer one is illustrated by bit string 240. Each box within bit string 240 may be represented by a binary value in order to provide the bit string. For example, the eight bits of section 240b of the bit string are allocated for describing the amount of free RAM. The eight bits of section 240a represent the availability of co-processors. The available portion of RAM associated with peer one is represented in section 240b-1. Here, the bits of section 240b-1 may be a logical high value to indicate free RAM. Of course, a logical low value may be used to represent the free RAM rather than the logical high value. Bit string 242, which corresponds to peer two illustrates the same configuration as bit string 240, with the exception of a different amount of RAM being available and a different amount of co-processors being available. More specifically, the amount of free RAM illustrated in section 242b-1 is a greater proportion of section 242b, which represents the total amount of RAM as compared to the corresponding portion of peer one. The amount of available co-processors in section 242a-1 is a representative portion of the total available co-processors illustrated by region 242a. Thus, the availability of resources are expressed as an allocation of bits, in which each individual peer pushes out over the network to other peers.

The fixed set of bits represented in FIG. 3 provide the availability of the applicable resource. It should be appreciated that in one embodiment, rather than using a base two distribution, i.e., a one (logical high value) or a zero (logical low value), a power law representation may be used. Under a base two distribution, eight bits will have a limit of representing 256 units. However, under an alternative representation, such as, for example, a power law representation, eight bits may represent billions of units. It should be appreciated that it is not necessary to have a precise availability. That is, if there are gaps between certain numbers as may occur with a power law distribution, the gaps do not affect the scheme provided herein. As the embodiments described herein enable searching for a range of available resources and do not rely on an exact amount, the gaps become irrelevant. Thus, a power law representation may be used where there may be gaps in the numbers represented.

In yet another embodiment, it is possible to provide a hybrid model in which a portion of the bits represent one scheme such as a base two distribution, while the remainder of the bits represent an alternative scheme such as a power law representation. Here, a small number of available resources can be represented accurately through the base two distribution, while the large number of available resources required when dealing with a large number of users can utilize the power law distribution. It should be appreciated that each peer in the peer-to-peer network would have an evaluator to recognize that the first four bits represent a first semantic, while the second four bits are representing a second semantic to describe the available resources. In this embodiment, $2^4$ or 16 units are available to be represented for a small amount of resources, while a power law distribution is used to represent available resources in excess of 16. In the organized/hierarchical tree structure discussed herein, the hybrid scheme is well suited for the aggregation as the higher level peers will be associated with a large amount of resources (power law distribution), while lower level peers are associated with a smaller amount of resources (binary distribution).

In one embodiment, the resource availability expressed in the bit strings of FIG. 3 is compatible with Bloom filters. A Bloom filter consists of two components: a set of hash functions and a bit vector of a given length. The length of the bit vector (number of bits) and the number of hash functions are set dependent upon the number of keys desired to be added and the acceptable error rate. The hash functions in a Bloom filter are configured so that their range matches the length of the bit vector. For example, if the bit vector is 200 bits long, the hash function returns a value between 1 and 200. A key is run through each of the hash functions and the result is treated as an offset into the bit vector to turn on the corresponding bit at that position. The hashing operation normally associated with Bloom filters can be replaced with other semantics, such as assigning semantic meaning to bits (like the binary or power-law values already discussed). This can be understood as a modified Bloom filter representation.

Figure 4:
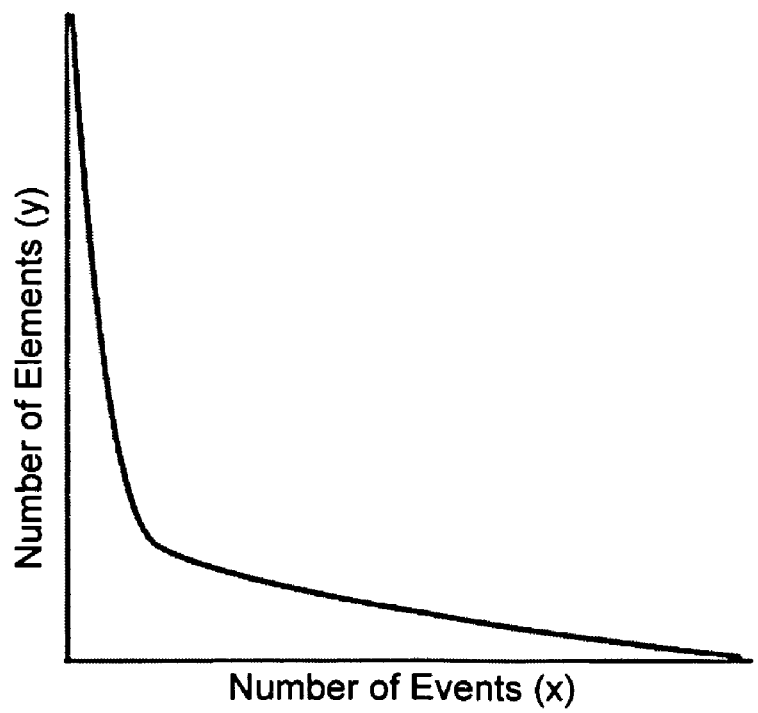
FIG. 4 is a simplified graphical representation of the advantage of using a power law distribution in a large network in accordance with one embodiment of the invention.

FIG. 4 is a simplified graphical representation of the advantage of using a power law distribution in a large network in accordance with one embodiment of the invention. The Y axis represents a number of elements, while the X axis represents a number of events. A power law distribution represents the probability distribution of events as $P[X]=y=ax^{-k}$ where a and k are constants. In one embodiment, the constants are tested to be optimized empirically in order to provide the desired scalability. In another embodiment, the Bloom filter units may include bits evaluated in terms of a power law distribution (modified Bloom filter).

Figure 5A:
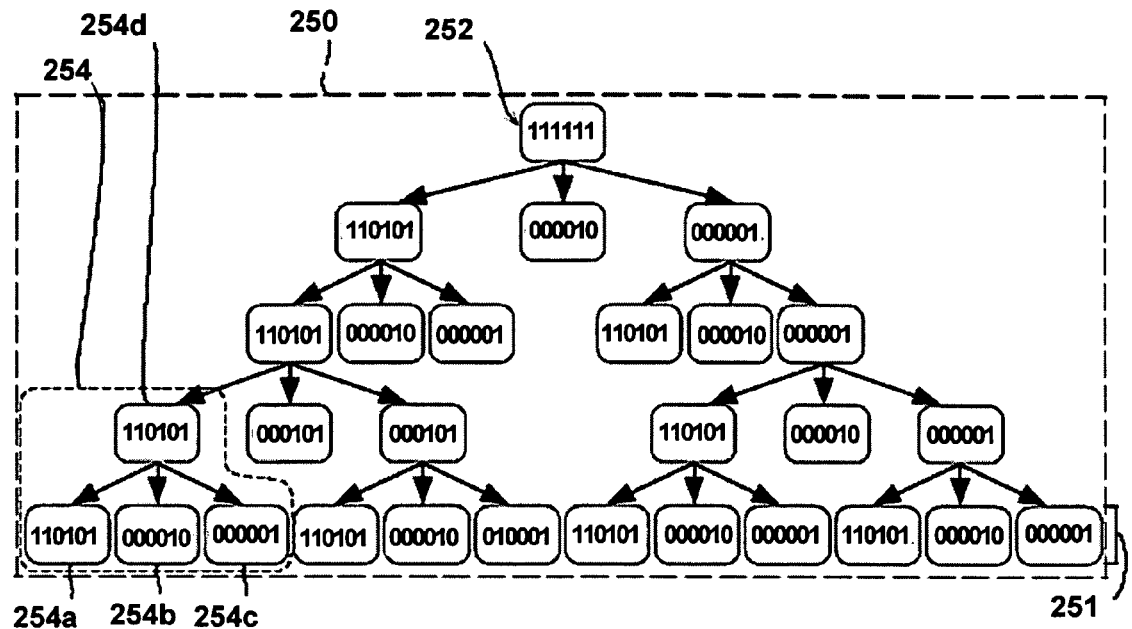
FIG. 5A is a simplified schematic diagram illustrating a hierarchical tree structure used for publishing and locating available resources in accordance with one embodiment of the invention.

FIG. 5A is a simplified schematic diagram illustrating a hierarchical tree structure used for publishing and locating available resources in accordance with one embodiment of the invention. The hierarchical tree structure of FIG. 5A illustrates root 252 at the top of the tree structure and a number of levels in which is defined a parent/child relationship. That is, on bottom level 251, in which each of the boxes represent a peer. The peers of level 251 are children of the corresponding peers represented on the next level. For example, peers 254a-c are children of peer 254d. It should be appreciated that the peers at the bottom level of the tree structure may be referred to as leaves. The bit strings represented in each of the peers of the hierarchical tree structure are used to indicate the available resources for the corresponding peer.

Still referring top FIG. 5A, in peer 254a a bit string of 000101 is used to represent the availability of the resource, e.g., a co-processor, available memory, disc space, network bandwidth, etc. Each child's bit string is communicated to the corresponding parent. The parent of peer 254a, i.e., peer 254d, is configured to aggregate the received bit strings from each child and incorporate its own available resources in order to define a bit string for the parent. Thus, the bit string associated with peer 254d, 100101, represents the aggregate of the bit strings from children 254a through 254c of parent 254d. It should be appreciated that the bit string of parent 254d may also include information as to available resources of the parent. The aggregation of the bit string may occur through a suitable mathematical operation providing addition up the tree.

One skilled in the art will appreciate that as the parents successively aggregate what the corresponding children are capable of in terms of available resources, the root node 252 will likely have its filter saturated. However, most searches through the hierarchical tree will rarely get to the root node. That is, most providers and users will be searching in the bottom portion of the distribution represented in FIG. 5A. Irrespective of which portion of the tree the search is being performed in, the use of a power law distribution for the upper portion of the tree will enable the embodiments described herein to accommodate peer-to-peer networks having a large number of peers, e.g., networks having 1 million or more peers. It should be further appreciated that the propagation of the bit string through the tree requires a relatively small amount of bandwidth due to the structure of the string. Propagation of the bit string up the tree will occur at regular (tunable) time intervals. Bandwidth use at the top of the tree does not grow proportional to the size of the tree because each tier of the tree fully and opaquely represents its children.

Figure 5B:
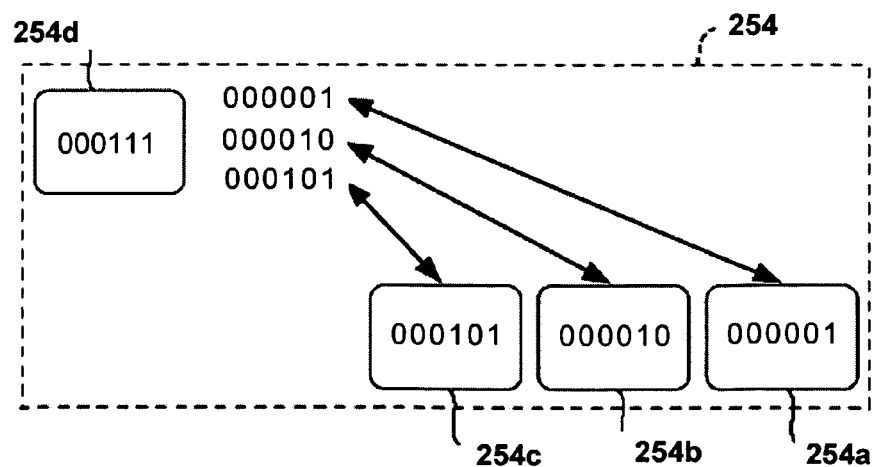
FIG. 5B is an expanded portion of the hierarchical tree of FIG. 5A.

FIG. 5B is an expanded portion of the hierarchical tree of FIG. 5A. Here, children 254a-254c and associated bit strings are illustrated along with parent 254d. The availability bit string associated with parent 254d, i.e., 000111, is an aggregation of each of the individual availability bit strings of children 254a through c. In one embodiment, parent 254d maintains an aggregate bit string and a cache of each child 254a-c. A request for a certain resource represented in a bit string may then easily be compared to the aggregate of each parent in order to determine if the request may be fulfilled by the parent or the children. For example, if a request bit string was received by parent 254d of 000001, then parent 254d will be able to determine that the request may be fulfilled by either child 254c or child 254a. Where more than one child may be able to fulfill the request, a heuristic such as locality may be used to determine which child to select. That is, based upon which child is closest to the requesting resource determines which child is selected to provide the resource. In another embodiment, each parent maintains a cache of the corresponding children for that parent.

Figure 6A:
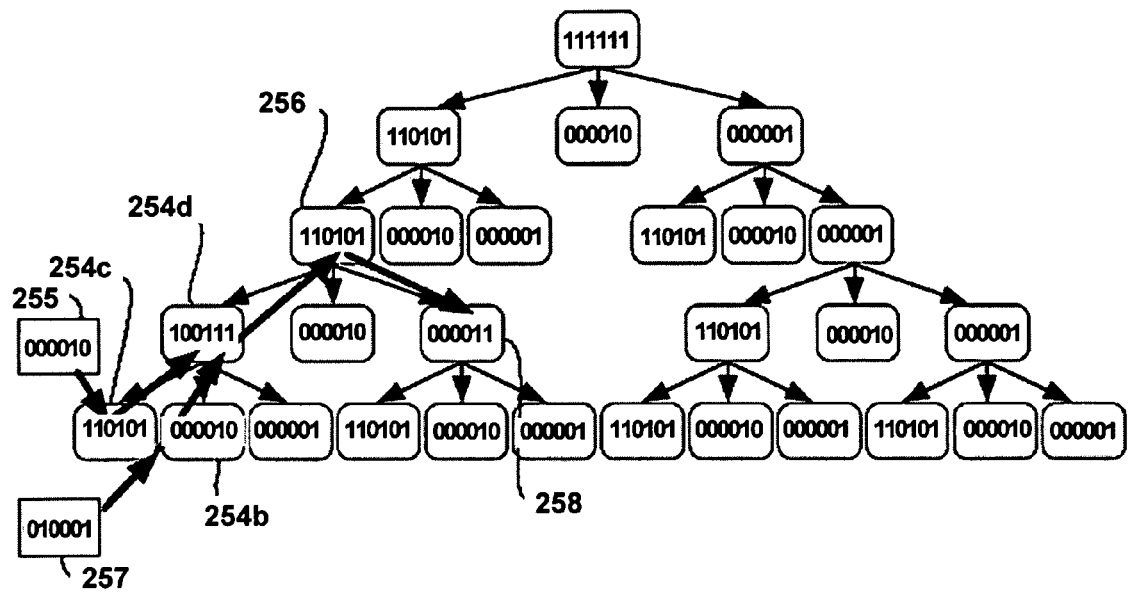
FIG. 6A is a simplified schematic diagram illustrating a scheme for routing resource queries through the hierarchical tree structure in accordance with one embodiment of the invention.

FIG. 6A is a simplified schematic diagram illustrating a scheme for routing resource queries through the hierarchical tree structure in accordance with one embodiment of the invention. Bit strings 255 and 257 each represent request bit strings from a peer requesting a certain resource. The request bit strings propagate up the hierarchical tree structure until they locate a peer that can satisfy the requests for the resource. For example, request string 257 propagates up to peer 256 at which point it is recognized that the children of peer 256 can fulfill the request for resources. Specifically, child 258 is associated with an availability string that satisfies the request string. Request string 255 is propagated from peer 254c to peer 254d. At peer 254d, a comparison of the request string with the aggregate availability string stored by peer 254d will yield that request string 255 may be satisfied through the children associated with peer 254d. In one embodiment, the comparison includes performing a logical operation, e.g., an AND operation with the request string and the aggregate availability string as inputs. Child 254b has the available resources to satisfy request string 255 in this example. It should be appreciated that once a peer is identified having the available resources, the requestor and that peer will communicate directly with each other. That is, it is not necessary to communicate through the parent of the peer providing the resources.

Figure 6B:
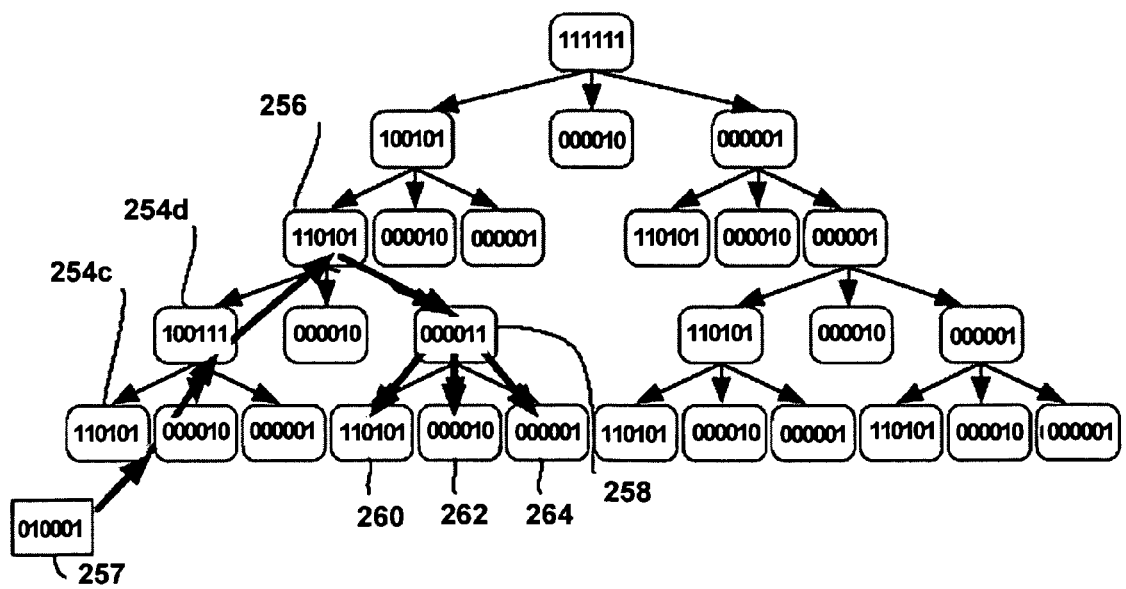
FIG. 6B is a simplified schematic diagram illustrating a scheme for satisfying aggregate queries in accordance with one embodiment of the invention.

FIG. 6B is a simplified schematic diagram illustrating a scheme for satisfying aggregate queries in accordance with one embodiment of the invention. Here, request 257, which may be a request for one thousand co-processors is issued as an aggregate query, rather than one thousand separate queries for one co-processor. The request propagates through the hierarchical tree structure as explained above with reference to FIG. 6A. It should be appreciated that the query can perform arithmetic operations appropriate to the bit string semantics as the query goes up and down the hierarchical tree to split the query into many sub queries. As illustrated between peer 258 and peers 260, 262 and 264, the query is split into three sub queries, where sub queries each satisfy a portion of the aggregate query. Here a list of peers providing the resources is provided to the requestor. That is, a list of peers capable of providing one thousand co-processors is returned to the requestor in above example.

In one embodiment, a portion of the resources requested may be fulfilled by a first parent, while the remaining portion of the requested resources is fulfilled by a parent of the first parent. Of course, the application providing this functionality would have to be able to be able to handle a portion of the requested resources being satisfied until the full amount of the requested resources are available. It should be appreciated that the communication protocol enabling communication through the structured tree includes an arbitration and reservation mechanism. The arbitration and reservation mechanism functions to reserve requested available resources so that a subsequent request for the same resources will be denied access to the reserved resources. For example, the first reservation request may generate a virtual reservation request which transforms into a real reservation once the reservation is fulfilled. If the first reservation request fails, then the reservation disappears.

Figure 7:
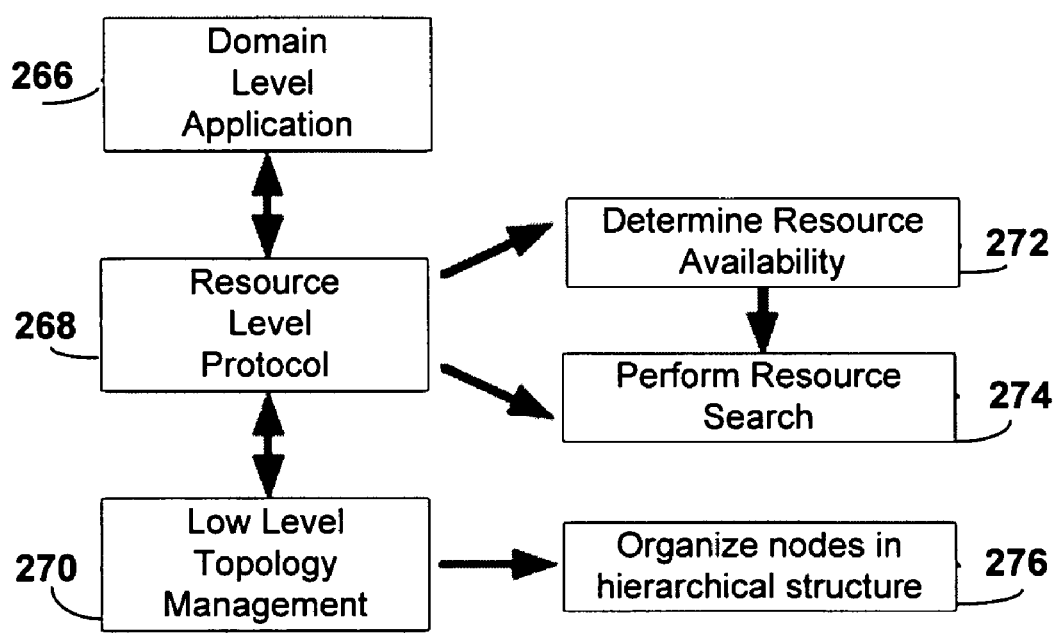
FIG. 7 is a simplified schematic diagram illustrating the block levels associated with the application of the scheme for identifying available resources in a peer-to-peer network in accordance with one embodiment of the invention.

FIG. 7 is a simplified schematic diagram illustrating the block levels associated with the application of the scheme for identifying available resources in a peer-to-peer network in accordance with one embodiment of the invention. Low level topology management block 270 encompasses the functionality required to organize nodes in a hierarchical tree structure as specified in block 276. Here, the peers of the peer-to-peer network are organized in a hierarchical tree structure similar to the tree structures of FIGS. 2E, 2F, 5A, 5B, 6A and 6B. Resource level protocol block 268 includes the functionality for determining resource availability specified in block 272 and for performing resource searches as illustrated in block 274. Here, the children peers propagate their availability strings to the corresponding parent peer up the hierarchical tree structure and then a request string is compared bit by bit to the available resource string in order to determine if a resource is available to fulfill the request. The functionality described above with respect to routing resource queries and determining matches is performed here. Domain level application block 266 then performs the action requested and communicates the results back to the requesting peer. In one embodiment, the resource is accessed as described in application Ser. No. 10/845,508 which has been incorporated by reference.

Figure 8:
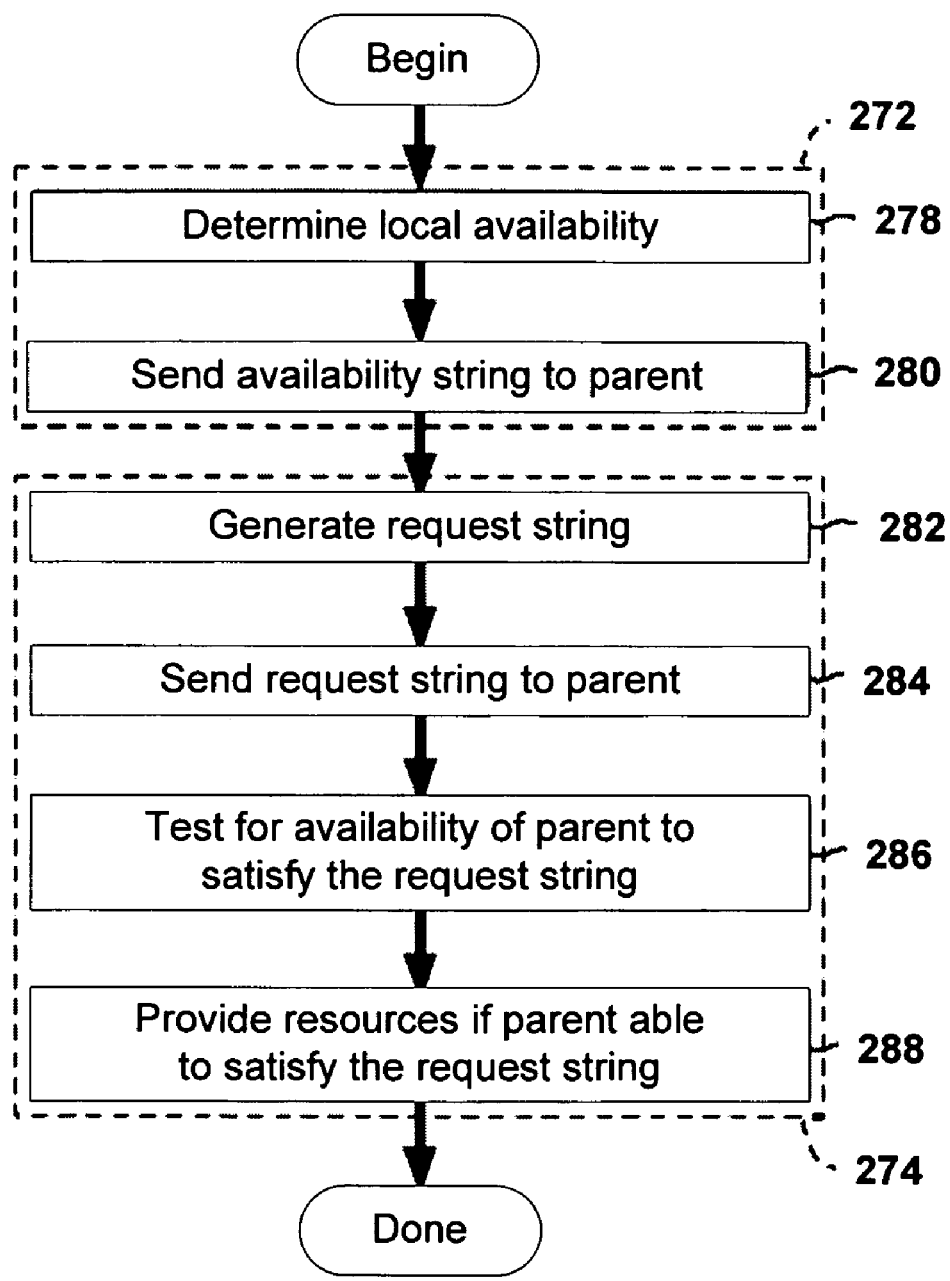
FIG. 8 is a flow chart diagram illustrating the method operations for a search for an available resource performed in a peer-to-peer network in accordance with one embodiment of the invention.

FIG. 8 is a flow chart diagram illustrating the method operations for a search for an available resource performed in a peer-to-peer network in accordance with one embodiment of the invention. The method initiates with operation 278 where local availability of a resource is determined. Here, the amount of an available resource is captured in a bit string as described above. In one embodiment, a Bloom filter is applied here. The method then advances to operation 280 where the availability bit string is sent to a parent of the peer having the available resource. It should be appreciated that operations 278 and 280 provide more detail to the functionality described with respect to block 272 of FIG. 7. It should be appreciated that prior to operation 278, the peers are organized in a hierarchical tree structure as described above.

The method then proceeds to operation 282 where a request string is generated. In operation 282, a peer requesting a resource defines that request as a bit string. The method then moves to operation 284 where the request string is sent to a peer. The peer then tests for the availability to satisfy the request string in operation 286. Here, a bit by bit comparison of the two bit strings may be performed through a logical operation. The method then advances to operation 288 where the resources are provided if the peer is able to satisfy the request string. If the peer cannot satisfy the request string, the request string is propagated up the structured tree to a parent of the peer and continues propagating up the structured tree until a resource satisfying the request is found. It should be appreciated that the resources will be provided directly from the peer identified as being able to provide the resources. That is, if the child of the peer has the available resources, then the requestor is provided with the address for the child and communicates directly with the child.

In summary, a method and system enabling identification of an available resource in a manner requiring low bandwidth. The peers of the P2P network are organized in a hierarchical tree structure having a root node where each parent is configured to successively encompass what the corresponding children are capable of supplying in terms of resources. Through the use of bit strings compatible with bloom filters the available resources are captured and aggregated. In order to accommodate the large size of the P2P network a power law distribution may be used to characterize at least a portion of the bit string. One skilled in the art will appreciate that alternative embodiments to the bit string may be used. For example, an extensible markup language (XML) representation may be used to describe the availability of resources. Here, a schema defining XML format that specifies the resource availability is equal to a value. This value may then be propagated and aggregated through the hierarchical tree structure.

It should be appreciated that the embodiments described above may be incorporated into on-line gaming applications with a subscriber base of hundreds of thousands of players located all over the world. Exemplary on-line gaming titles include EVERQUEST, PLANET SIDE and STAR WARS GALAXIES played through the PLAYSTATION 2 video game console. One application incorporating the embodiments described above may occur during video encoding. For example, if a computing device needs to encode 1000 frames of video and does not have the local computing resources to accomplish this in a certain time frame, then the computing device may deputize a number of other computing devices to help encode the video. Thus, the computing device generates a request asking for 100 other processors having a certain bandwidth and storage overhead locally on each of the 100 other processors. The bit stream may be a base two distribution, a power law distribution or some combination of the two. The request is pushed out to the parent and the resource availability algorithm propagates the request to identify the available resources satisfying the request.

It should be appreciated that the bit stream used to represent the resource availability and the resource request is not limited to the specific embodiments referred to above. That is, the bit stream is not limited to only a first portion and second portion, where one portion is a base two representation and the other portion is a power law representation. For example, the entire bit stream may be a single representation. Alternatively, the bit stream may be subdivided into more than two portions. The bit stream is not limited to a base two or power law distribution. For example, a base ten, or any other suitable base distribution that may be represented in the bit stream, can be incorporated into the embodiments described herein. In one embodiment, the lower third of the bit stream may represent fractional values in base two, e.g., these lower third bits can be used to represent 10%, 20%, 50%, etc., availability of a processor. The middle third of the bit stream represents whole processors in a base ten representation, while the upper third of the bit stream represents large groups of processors in a power law representation. Thus, the bit stream may have numerous configurations, i.e., single or multiple subdivisions with a single or multiple representations being used.

As mentioned above, the regular representation of the data in the bit stream enables the ease with which the request may propagate since the bit stream is relatively small, e.g., one kilobyte of bits per node. Thus, each peer automatically publishes and updates its available resources regularly without impacting bandwidth. Once the available resources have been identified, the resources may be accessed as described above. In one embodiment, accounting and usage charges may be incorporated and enforced to provide incentive for peers to share resources.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system having processor logic embedded on a data storage device which when read by the system causes the system to perform a method for publishing and identifying an available resource in a peer-to-peer distributed network, comprising:

topology management logic for organizing nodes within the peer-to-peer distributed network into a hierarchical tree; and resource level logic configured to determine availability of a resource contained within a node of the hierarchical tree, the resource level logic further configured to represent the availability of the resource as a first bit string for transmission to a parent of the node, wherein the parent is configured to aggregate the first bit string from each node under the parent to generate an aggregate bit string, the aggregate bit string of the parent used to compare a request string to the aggregate bit string through a logical operation in order to determine whether the resource can be fulfilled by the parent or one or more nodes under the parent, wherein the resource level logic is configured to split the request string into a plurality of sub request strings in order to match available resources with resources requested by the request string, the matching of available resources to the sub request strings resulting in the satisfaction of the resource requirements of the request string.

2. The system of claim 1, further comprising:

domain level application logic configured to provide the functionality for using the resource after the resource is determined as being available through the resource level logic.

3. The system of claim 1, wherein the hierarchical tree is one of a regular recursive tree or a self-organizing tree.

4. The system of claim 3, wherein the self organizing tree organizes parents and corresponding children based upon locality of the parents and corresponding children.

5. The system of claim 1, wherein the parent is further configured to provide an address of the node if the node can provide the resource.

6. The system of claim 1, wherein the logical operation compares each corresponding bit of the request string and the first bit string.

7. The system of claim 1, wherein both the request string and the first bit string are hybrid bit strings having a first portion representing a binary number and a second portion representing a power law distribution.

8. The system of claim 1, wherein the request string is an aggregate request string.

9. The system of claim 8, wherein the parent is capable of fulfilling resource request of a sub request string of the request string and wherein a parent of the parent is capable of fulfilling remaining sub request strings of the request string.

10. The system of claim 1, further includes an arbitration and reservation logic to reserve requested available resources of the parent until a full amount of the requested resources is available, the reservation of available resources preventing other request strings from accessing the reserved resources till the request string is completed.

11. A peer-to-peer grid with processor logic embedded on a data storage device available at the grid which when executed causes the grid to publish and identify an available resource in the peer-to-peer grid, comprising:

a plurality of peers configured to be arranged in a hierarchical tree, the plurality of peers including, a first peer in communication with a second peer, the first peer being configured to transmit an availability string to the second peer, the availability string representing availability of a resource associated with the first peer, the second peer generating an aggregate availability string that includes resource availability of the first peer and the second peer;

a third peer configured to generate a request string representing a request for the resource; and logic for comparing bits of the aggregate availability string to bits of the request string in order to determine if the aggregate availability string of the second peer can fulfill the request for the resource, the logic locally available to each of the plurality of peers, wherein the logic is configured to split the request for the resource into a plurality of sub requests in order to match available resources with resource requested by the request string, the matching of available resources to the sub request strings resulting in the satisfaction of the resource requirements of the request string.

12. The peer-to-peer grid of claim 11, wherein both the request string and the availability string include a first portion representing a binary number and a second portion representing a power law distribution.

13. The peer-to-peer grid of claim 12, wherein each peer includes an evaluator configured to recognize the first portion as the binary number and the second portion as the power law distribution.

14. The peer-to-peer grid of claim 11, wherein the second peer is configured to receive multiple availability strings, the second peer further configured to aggregate the multiple availability strings.

15. The peer-to-peer grid of claim 11, wherein the hierarchical tree is one of a regular recursive tree or a self-organizing tree.

* * * * *